S. A. M. ROSE.
RECORDING TARGET.
APPLICATION FILED AUG. 5, 1914.
1,189,628.
Patented July 4, 1916.
3 SHEETS—SHEET 1.
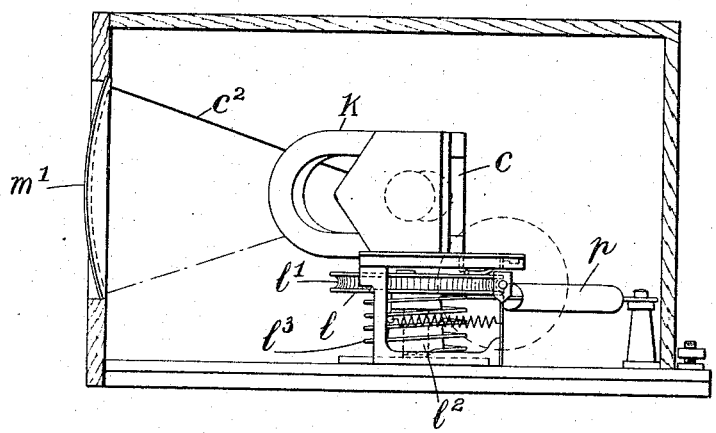
Fig 1
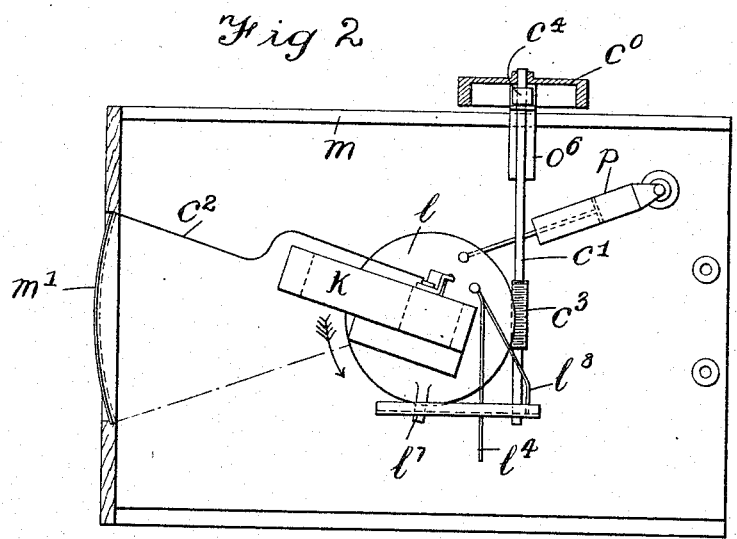
Fig 2
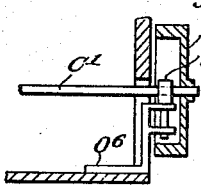
Fig. 2ª

S. A. M. ROSE.
RECORDING TARGET.
APPLICATION FILED AUG. 5, 1914.

1,189,628.

Patented July 4, 1916.
3 SHEETS—SHEET 3.

UNITED STATES PATENT OFFICE.

SYDNEY ASTON MERSEY ROSE, OF LONDON, ENGLAND.

RECORDING-TARGET.

1,189,628.   Specification of Letters Patent.   Patented July 4, 1916.

Original application filed February 6, 1911, Serial No. 606,922. Divided and this application filed August 5, 1914. Serial No. 855,283.

*To all whom it may concern:*

Be it known that I, SYDNEY ASTON MERSEY ROSE, formerly residing at Waldorf Chambers, Aldwych, in the city of Westminster, London, England, but now residing at 79 Elgin avenue, Maida Vale, London, England, a subject of the King of Great Britain and Ireland, have invented a new and useful Improvement in Recording-Targets, of which the following is a specification.

This invention relates to recording targets, and more particularly to the recorders or indicators for use with targets of that type in which a flexible strip is passed over a series of contacts, one or more of which operates, as the perforation effected by a shot passes over same, to establish an electric circuit for actuating the recorder or indicator.

My present invention consists in certain improvements in the means for recording or indicating the position of the shots on the targets.

In my co-pending application filed 6th February, 1911, Serial No. 606922, I have described the electrical system employed for recording the positions of the shots and this divisional application is directed to the construction of the indicator mechanism.

Figure 3:
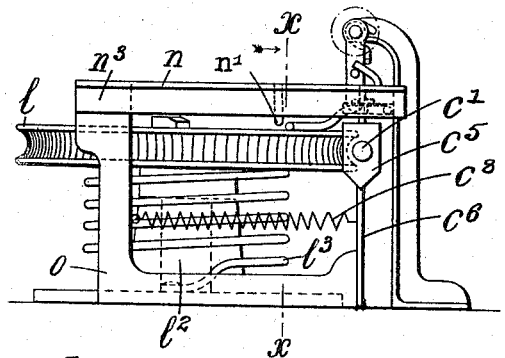
Figure 5:
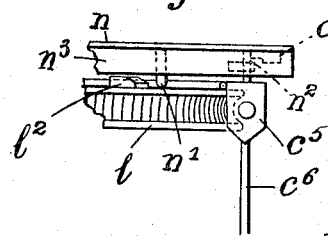
Figure 6:
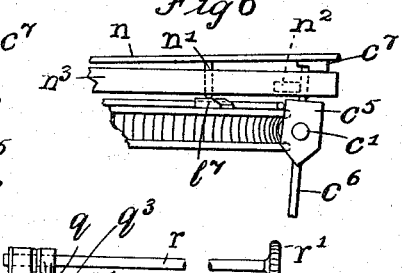
Figure 4:
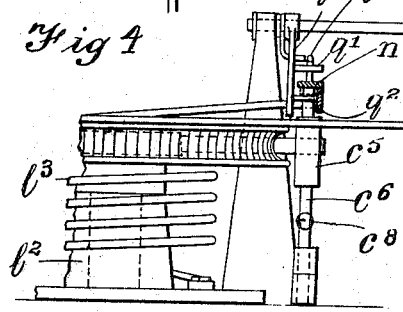
Figure 7:
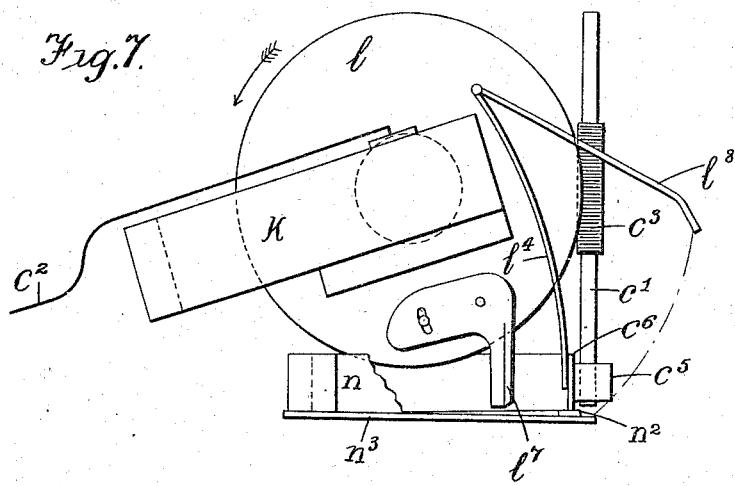
Figure 8:
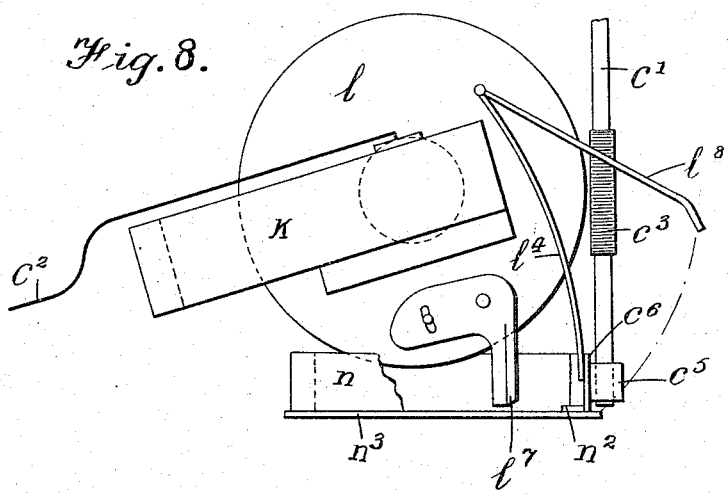
Figure 9:
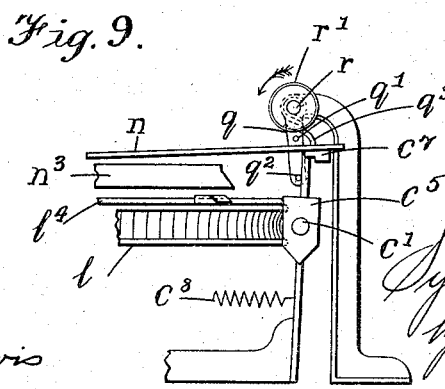

In the accompanying drawings: Figure 1 illustrates in side elevation an indicator constructed according to this invention, and Fig. 2 is a plan view partly in section of the indicator. Fig. 2$^a$ is a detail sectional view showing the construction of the pivot bearing appearing in Fig. 2. Fig. 3 is a side elevation to an enlarged scale of the mechanism for releasing the turn-table of the indicator hereinafter described, and Fig. 4 is a view on the line $x$—$x$ in Fig. 3 and looking in the direction of the arrows. Figs. 5 and 6 are detail views of the indicator releasing mechanism. Figs. 7 and 8 are plan views showing different positions of certain parts of the indicator mechanism. Fig. 9 is a view in side elevation showing a detail of construction hereinafter described.

The indicator comprises an instrument $c$ similar to a galvanometer and having a pointer $c^2$ which is attached to the well-known moving coil rotatable within the magnet $k$. This magnet is fixed upon a table $l$ which, in the construction illustrated, is, by way of example, circular in form and is provided at its periphery with teeth $l'$ which mesh with a worm $c^3$ on the spindle $c'$. The table is pivotally mounted upon a stand $l^2$ and has attached to it one end of a spring $l^3$ the other end of which is fixed to the said stand. The spindle $c'$ is supported at its inner end in a bearing $c^5$ carried by an arm $c^6$ controlled by a spring $c^8$ which normally causes the worm $c^3$ to engage with the table $l$. The outer end of the spindle $c'$ is furnished with the pulley $c^0$ which is driven as described in my said co-pending application from the main target, and this end of the spindle is carried in a bearing $c^4$ which is pivoted in a support $o^6$ mounted upon one wall of a casing $m$ which incloses the instrument.

Adjacent to the table $l$ and at right-angles to the spindle $c'$ is a stand $o$ furnished at its upper end with two spring arms $n$, $n^3$ each in the form of a flat spring and arranged at right-angles to each other longitudinally. The spring arm $n$ is provided at its outer end with a projection or catch $c^7$ and the spring arm $n^3$ is likewise furnished with a projection $n^2$ adjacent to the projection $c^7$. The arm $n$ is provided with a second projection $n'$ which extends downwardly into the path of a lug or extension $l^7$ mounted upon the table $l$. In addition to the extension $l^7$ the table is provided with a spring finger $l^4$ which extends some little distance beyond the table $l$, and with an arm $l^8$ of such a length that when the table is in its normal position this arm presses the spring arm $n^3$ outwardly. The table $l$ and its accessories are mounted within a casing $m$ furnished with a translucent disk $m'$ arranged opposite to the pointer $c^2$ and marked to correspond with the representation to be fired at on the target at the butt.

A shot having been fired at the target at the butt and the flexible strip having been set in motion as described in my said application, the pulley $c^0$ will be rotating and revolving the spindle $c'$ so that the latter rotates the table $l$ in the direction of the arrow in Figs. 2 and 7. The pointer $c^2$ of the instrument $c$ mounted upon the table $l$ will thus travel horizontally across the duplicate target $m'$ corresponding with the travel of the main target until the travel of the latter is stopped, whereupon the electric current flows through the instrument and causes the pointer $c^2$ to move in a vertical plane. To return the pointer to its normal position the flexible strip at the target is again set in motion, with the effect that the rotation of the table is continued in the direction of the arrow in Figs. 2 and 7. This continued rotation of the table brings the spring finger $l^4$ against the bearing $c^5$ which it presses until the extension $l^7$ passes beneath the projection $n'$ and raises the spring arm $n$. When the spring arm $n$ is thus raised the upper end of the arm carrying the bearing $c^5$ is released from its catch $c^7$ and the bearing $c^5$ pushed away by means of the spring finger $l^4$ so as to release the worm $c^3$ on the spindle $c'$ from the table. While the table has been rotating in this direction the spring $l^3$ has been wound, and immediately the worm $c^3$ is released from the table the said spring rotates the table in the opposite direction, thus returning the pointer to its normal position. To prevent the too rapid return of the table $l$ a dash-pot $p$ is provided. During the return movement of the table the return of the bearing $c^5$ is prevented by means of the projection $n^2$ on the arm $n^3$, as shown in Fig. 8, and when the table has nearly reached the end of its return movement the arm $l^8$ on the table engages with and pushes out the arm $n^3$, thus releasing the catch $n^2$ on the latter from the arm $c^6$ carrying the bearing $c^5$. Immediately the arm $c^6$ is thus released, its spring $c^8$ pulls the bearing $c^5$ toward the table and brings the worm $c^3$ into engagement with the teeth $l'$ on the periphery of the latter. The return of the table may, however, be effected by releasing means comprising a lever $q$ fixed to a shaft $r$ which passes through the casing and is adapted to be rotated by a head $r'$. The lever $q$ is provided with two lateral projections $q'$, $q^2$ of which the former engages with an inclined pin $q^3$ upon the upper side of the spring arm $n$. Assuming the table $l$ to have rotated to indicate the position of a shot, the spring arm $l^4$ will be pressing against the bearing $c^5$ of the shaft $c'$. To return the indicator to its normal position the shaft $r$ is rotated in the direction of the arrow shown in Fig. 9, whereupon the projection $q'$ on the lever $q$ raises the arm $n$ and releases the bearing $c^5$ from its catch $c^7$ with the result that the spring $l^4$ disengages the worm $c^3$ from the table $l$. The table now returns under the influence of the spring $l^3$ to its normal position; but the return of the bearing $c^5$ of the shaft $c^2$ is arrested by the other projection $q^2$ on the lever $q$. The table having returned, the shaft $r$ is released and the lever $q$ returned under the influence of the spring $q^4$, thereby releasing the shaft-bearing $c^5$ and permitting the worm $c^3$ to reëngage the table $l$.

What I claim is:—

1. In indicators for recording targets, the combination, with a pointer, of a rotatable table whereon said pointer is mounted, teeth on the periphery of said table, a shaft furnished with a worm for engagement with said teeth, a spring-controlled bearing at one end of said shaft and a pivoted bearing at the opposite end thereof, means on said table for disengaging said worm at the end of the travel of the table, a spring for returning the table and means operated by said table for reëngaging the worm with its teeth.

2. In recording target indicators, the combination with a pointer and a rotatable table carrying the same, of a worm-shaft for rotating said table, a spring-controlled bearing at one end of said shaft, a spring arm on said table which serves at the end of the travel of the table in one direction to disengage said worm-shaft from the table, means for returning the table, a catch which holds said shaft in its disengaged position and an arm which on the return of the table releases said shaft and permits it to reengage with said table.

In witness I have hereunto set my hand in the presence of two witnesses.

SYDNEY ASTON MERSEY ROSE.

Witnesses:
O. J. WORTH,
E. L. H. ELLIOTT.

Copies of this patent may be obtained for five cents each, by addressing the "Commissioner of Patents, Washington, D. C."